United States Patent
Imaizumi et al.

(10) Patent No.: US 6,522,935 B1
(45) Date of Patent: Feb. 18, 2003

(54) CONTROL-SPECIFICATION DESIGN MANAGEMENT SYSTEM USED FOR LOAD CONTROL DEVICES

(75) Inventors: Nobuhiro Imaizumi, Shizuoka (JP); Tatsuaki Oniishi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 1176 days.

(21) Appl. No.: 08/674,452

(22) Filed: Jul. 1, 1996

(30) Foreign Application Priority Data

Jun. 29, 1995 (JP) .............................. 7-164252

(51) Int. Cl.⁷ .............................................. G06F 15/46
(52) U.S. Cl. ............................................ 700/12; 700/9
(58) Field of Search ................... 340/825.06, 825.07; 307/9.1; 370/360, 363, 367, 368, 371, 373, 374, 378, 381, 386, 387, 388; 345/919, 921, 964, 965; 364/492, 140, 488, 489, 138, 925, 925.2, 925.3, 925.4, 926.9, 141, 425, 424.045, 424.059; 315/312, 314, 315, 316, 317, 318, 319, 320; 700/12

(56) References Cited

U.S. PATENT DOCUMENTS

| | | | | |
|---|---|---|---|---|
| 4,484,258 A | * | 11/1984 | Miller et al. | 700/12 |
| 4,510,565 A | * | 4/1985 | Dummermuth | 700/7 |
| 4,853,888 A | * | 8/1989 | Lata et al. | 364/900 |
| 4,855,896 A | * | 8/1989 | Oho et al. | 364/138 |
| 5,249,115 A | * | 9/1993 | Reid | 700/12 |
| 5,438,506 A | * | 8/1995 | Oho et al. | 364/138 |

FOREIGN PATENT DOCUMENTS

| | | | |
|---|---|---|---|
| EP | 0 000 427 | 1/1979 | B60R/18/04 |
| EP | 0 251 477 | 1/1988 | G06F/3/023 |
| EP | 0 594 144 | 4/1994 | H04L/12/40 |
| JP | 3-240802 | 10/1991 | G05B/15/02 |
| JP | 4-80801 | 3/1992 | G05B/15/02 |
| JP | 5-55701 | 7/1993 | B60L/1/00 |

* cited by examiner

*Primary Examiner*—James P. Trammell
*Assistant Examiner*—Daniel L. Greene
(74) *Attorney, Agent, or Firm*—Sughrue Mion, PLLC

(57) ABSTRACT

In designing the connection correspondence of the control switches to the loads, the control-specification design management system used for the load control devices refers to the connection correspondence stored in the look-up table or a slip file prepared in the preceding design, and presents to a designer candidates for the loads that can be controlled when these are connected to the control switches. While seeing the candidates, the designer selects the most suitable one from among those presented candidates. He designs control-specification information and prints out the contents of the slip file.

6 Claims, 21 Drawing Sheets

| | | | |
|---|---|---|---|
| 1 | | USER NO. | : XX110000XX |
| 2 | | USER NAME | : XX KANKO CORP. |
| 3 | | DATE | : 95.06.16 |
| 4 | | SW1 NAME | : ROOM LAMP |
| 5 | | SW2 NAME | : READING LAMP |
| 6 | | SW3 NAME | : |
| 7 | | SW4 NAME | : CHANDELIER |
| 8 | | SW5 NAME | : DECORATION LAMP |
| 9 | | SW6 NAME | : |
| 10 | | SW7 NAME | : PASSAGE LAMP |
| 11 | | SW8 NAME | : |
| 12 | | SW9 NAME | : |
| 13 | | SW10 NAME | : REFRIGERATOR |
| 14 | | SW11 NAME | : WATER HEATER |
| 15 | | SW12 NAME | : |
| 16 | DETAILS SETTING TERMINAL CONNECTOR | 1ST TERMINAL | RELATED SW NO.: SW1 |
| 17 | | | TERMINAL NAME : POWER SOURCE FOR ROOM LAMP |
| 18 | | 2ND TERMINAL | RELATED SW NO.: SW2 |
| 19 | | | TERMINAL NAME : POWER SOURCE FOR READING LAMP |
| 20 | | 3RD TERMINAL | RELATED SW NO.: |
| 21 | | | TERMINAL NAME : |
| 22 | | 4TH TERMINAL | RELATED SW NO.: |
| 23 | | | TERMINAL NAME : |
| 24 | | 5TH TERMINAL | RELATED SW NO.: SW4 |
| 25 | | | TERMINAL NAME : POWER SOURCE FOR CHANDELIER |
| 26 | | 6TH TERMINAL | RELATED SW NO.: SW5 |
| 27 | | | TERMINAL NAME : POWER SOURCE FOR DECORATION LAMP |
| 28 | | 7TH TERMINAL | TERMINAL NAME : CEILING GND |
| 29 | | 8TH TERMINAL | TERMINAL NAME : |
| 30 | DETAILS SETTING TERMINAL CONNECTOR | 1ST TERMINAL | RELATED SW NO.: SW7 |
| 31 | | | TERMINAL NAME : POWER SOURCE FOR PASSAGE LAMP |
| 32 | | 2ND TERMINAL | RELATED SW NO.: |
| 33 | | | TERMINAL NAME : |
| 34 | | 3RD TERMINAL | RELATED SW NO.: SW10 |
| 35 | | | TERMINAL NAME : POWER SOURCE FOR REFRIGERATOR |
| 36 | | 4TH TERMINAL | RELATED SW NO.: SW11 |
| 37 | | | TERMINAL NAME : POWER SOURCE FOR WATER HEATER |
| 38 | | 5TH TERMINAL | RELATED SW NO.: |
| 39 | | | TERMINAL NAME : |
| 40 | | 6TH TERMINAL | RELATED SW NO.: |
| 41 | | | TERMINAL NAME : |
| 42 | | 7TH TERMINAL | TERMINAL NAME : FLOOR GND |
| 43 | | 8TH TERMINAL | TERMINAL NAME : |

FIG. 7

| # | | | |
|---|---|---|---|
| 1 | | USER NO. | : XX110000XX |
| 2 | | USER NAME | : XX KANKO CORP. |
| 3 | | DATE | : 95.06.16 |
| 4 | | SW1 NAME | : ROOM LAMP |
| 5 | | SW2 NAME | : READING LAMP |
| 6 | | SW3 NAME | : |
| 7 | | SW4 NAME | : CHANDELIER |
| 8 | | SW5 NAME | : DECORATION LAMP |
| 9 | | SW6 NAME | : |
| 10 | | SW7 NAME | : PASSAGE LAMP |
| 11 | | SW8 NAME | : |
| 12 | | SW9 NAME | : |
| 13 | | SW10 NAME | : REFRIGERATOR |
| 14 | | SW11 NAME | : WATER HEATER |
| 15 | | SW12 NAME | : |
| 16 | DETAILS | 1ST TERMINAL | RELATED SW NO.: SW1 |
| 17 | | | TERMINAL NAME : POWER SOURCE FOR ROOM LAMP |
| 18 | SETTING | 2ND TERMINAL | RELATED SW NO.: SW2 |
| 19 | | | TERMINAL NAME : POWER SOURCE FOR READING LAMP |
| 20 | | 3RD TERMINAL | RELATED SW NO.: |
| 21 | | | TERMINAL NAME : |
| 22 | TERMINAL | 4TH TERMINAL | RELATED SW NO.: |
| 23 | | | TERMINAL NAME : |
| 24 | | 5TH TERMINAL | RELATED SW NO.: SW4 |
| 25 | | | TERMINAL NAME : POWER SOURCE FOR CHANDELIER |
| 26 | CONNECTOR | 6TH TERMINAL | RELATED SW NO.: SW5 |
| 27 | | | TERMINAL NAME : POWER SOURCE FOR DECORATION LAMP |
| 28 | | 7TH TERMINAL | TERMINAL NAME : CEILING GND |
| 29 | | 8TH TERMINAL | TERMINAL NAME : |
| 30 | DETAILS | 1ST TERMINAL | RELATED SW NO.: SW7 |
| 31 | | | TERMINAL NAME : POWER SOURCE FOR PASSAGE LAMP |
| 32 | SETTING | 2ND TERMINAL | RELATED SW NO.: |
| 33 | | | TERMINAL NAME : |
| 34 | | 3RD TERMINAL | RELATED SW NO.: SW10 |
| 35 | | | TERMINAL NAME : POWER SOURCE FOR REFRIGERATOR |
| 36 | TERMINAL | 4TH TERMINAL | RELATED SW NO.: SW11 |
| 37 | | | TERMINAL NAME : POWER SOURCE FOR WATER HEATER |
| 38 | | 5TH TERMINAL | RELATED SW NO.: |
| 39 | | | TERMINAL NAME : |
| 40 | CONNECTOR | 6TH TERMINAL | RELATED SW NO.: |
| 41 | | | TERMINAL NAME : |
| 42 | | 7TH TERMINAL | TERMINAL NAME : FLOOR GND |
| 43 | | 8TH TERMINAL | TERMINAL NAME : |

FIG. 8

| SW3 | SW6 | SW9 | SW12 |
|---|---|---|---|
| SW2<br>READING LAMP | SW5<br>DECORATION LAMP | SW8 | SW11<br>WATER HEATER |
| SW1<br>ROOM LAMP | SW4<br>CHANDELIER | SW7<br>PASSAGE LAMP | SW10<br>REFRIGERATOR |

SWITCH LAYOUT TABLE

USER NAME : XX KANKO CORP.
USER NO. : XX110000XX
DATE : 95.06.16
PRINT : 95.06.16

[PRINT EXAMPLE OF SLIP FILE 14]

TERMINAL LAYOUT TABLE

USER NAME : XX KANKO CORP.
USER NO. : XX110000XX
DATE : 95.06.16
PRINT : 95.06.16

| CONNECTOR 1 | | |
|---|---|---|
| NO. | TERMINAL NAME | RELATED SWITCH NAME |
| 1 | POWER SOURCE FOR ROOM LAMP | ROOM LAMP |
| 2 | POWER SOURCE FOR READING LAMP | READING LAMP |
| 3 | | |
| 4 | | |
| 5 | POWER SOURCE FOR CHANDELIER | CHANDELIER |
| 6 | POWER SOURCE FOR DECORATION LAMP | DECORATION LAMP |
| 7 | CEILING GND | GND |
| 8 | | |

| CONNECTOR 2 | | |
|---|---|---|
| NO. | TERMINAL NAME | RELATED SWITCH NAME |
| 1 | POWER SOURCE FOR PASSAGE LAMP | PASSAGE LAMP |
| 2 | | |
| 3 | POWER SOURCE FOR REFRIGERATOR | REFRIGERATOR |
| 4 | POWER SOURCE FOR WATER HEATER | WATER HEATER |
| 5 | | |
| 6 | | |
| 7 | FLOOR GND | GND |
| 8 | | |

SW : CONTROL SWITCHES 22

FIG. 15

[LOOK-UP TABLE 12 CONTAINING TYPES OF CONTROL SWITCHES 22]

| NO. | TYPE |
|---|---|
| 1 | OPERATION SWITCH |
| 2 | RELAY COIL |
| 3 | INCANDESCENT LAMP DIMMING |
| 4 | FLUORESCENT LAMP DIMMING |
| 5 | POWER SOURCE FOR FLUORESCENT LAMP |
| 6 | MIRROR |
| 7 | 2F WIPER |
| 8 | 2F WIPER SWITCH |
| 9 | VENTILATING FAN |
| 10 | CONTROL SWITCH FOR VENTILATING FAN |
| 11 | TV SLIDER |
| 12 | SWING ANTENNA |
| 13 | BATTERY RELAY |
| 14 | DOOR / EMERGENCY BELL |
| 15 | CLOCK |
| 16 | TRUNK LAMP |

[LOOK-UP TABLE 12 CONTAINING THE CORRESPONDENCE OF THE
POSITIONS OF THE CONTROL SWITCHES 22 TO THE ASSIGNED NUMBERS]

| NO. | POSITION | NO. | POSITION |
|---|---|---|---|
| 1 | A1 | 25 | I1 |
| 2 | A2 | 26 | I2 |
| 3 | A3 | 27 | I3 |
| 4 | B1 | 28 | J1 |
| 5 | B2 | 29 | J2 |
| 6 | B3 | 30 | J3 |
| 7 | C1 | 31 | K1 |
| 8 | C2 | 32 | K2 |
| 9 | C3 | 33 | K3 |
| 10 | D1 | 34 | L1 |
| 11 | D2 | 35 | L2 |
| 12 | D3 | 36 | L3 |
| 13 | E1 | 37 | M1 |
| 14 | E2 | 38 | M2 |
| 15 | E3 | 39 | M3 |
| 16 | F1 | 40 | 2F WIPER |
| 17 | F2 | 41 | MIRROR FACE CONTROL |
| 18 | F3 | 42 | FOLDING MIRROR |
| 19 | G1 | 43 | MIRROR HEATER |
| 20 | G2 | | |
| 21 | G3 | | |
| 22 | H1 | | |
| 23 | H2 | | |
| 24 | H3 | | |

[LOOK-UP TABLE 12 CONTAINING LOAD CONTROL CONDITIONS]

| NO. | CONTROL CONDITIONS | SET ITEMS |
|---|---|---|
| 1 | DOOR SYSTEM | SWING / FOLDING |
| 2 | LAMP MAKERS | MAKER 1 / MAKER 2 |
| 3 | MIRROR FACE CONTROL | CONTROL / NONCONTROL |
| 4 | FOLDING MIRROR | PRESENT / ABSENT |
| 5 | MIRROR HEATER | PRESENT / ABSENT |
| 6 | 2F WIPER INTERLOCK | PRESENT / ABSENT |
| 7 | VENTILATING FAN SWITCH | PRESENT / ABSENT |
| 8 | VENTILATING FAN DRIVE | AC / DC |
| 9 | MAKER OF TV SLIDER | MAKER 1 / MAKER 2 |
| 10 | CLOCK | PRESENT / ABSENT |
| 11 | BIT 7 CONTROL | PRESENT / ABSENT |
| 12 | DEFAULT CONTROL | CONTINUE / ON / OFF |
| 13 | CANCEL CONTROL | PRESENT / ABSENT |
| 14 | LIGHTING CONTROL | PRESENT / ABSENT |
| 15 | SIG1 / SIG2 SELECT | SIG1 / SIG2 |
| 16 | SIG1 DOOR INTERLOCK CONTROL | PRESENT / ABSENT |
| 17 | SIG1 DOOR INTERLOCK CONTROL SYSTEM | OPEN / CLOSE (WHEN DOOR INTERLOCK IS USED) |
| 18 | SIG1 FLASHING CONTROL | PRESENT / ABSENT |
| 19 | SIG2 DOOR INTERLOCK CONTROL | PRESENT / ABSENT (FOR SIG 2) |
| 20 | SIG2 DOOR INTERLOCK CONTROL SYSTEM | OPEN / CLOSE (WHEN DOOR INTERLOCK IS USED FOR SIG2) |
| 21 | SIG2 FLASHING CONTROL | PRESENT / ABSENT (FOR SIG 2) |

FIG. 18 [LOOK-UP TABLE CONTAINING CONTROL CONDITIONS THAT CAN BE SELECTED EVERY TYPE OF THE CONTROL SWITCH]
(○: CAN BE SELECTED, ×: CANNOT BE SELECTED)

| | CONTROL CONDITIONS<br>TYPE OF SWITCH | DOOR SYSTEM | LAMP MAKER | MIRROR FACE CONTROL | FOLDING MIRROR | MIRROR HEATER | 2F WIPER INTERLOCK PRESENT | VENTILATING FAN CONTROL SWITCH | VENTILATING FAN HEATER TYPE |
|---|---|---|---|---|---|---|---|---|---|
| 1 | OPERATION SWITCH | ○ | × | × | × | × | × | × | × |
| 2 | RELAY COIL | ○ | × | × | × | × | × | × | × |
| 3 | INCANDESCENT LAMP DIMMING | ○ | × | × | × | × | × | × | × |
| 4 | FLUORESCENT LAMP DIMMING | ○ | ○ | × | × | × | × | × | × |
| 5 | POWER SOURCE FOR FLUORESCENT LAMP | ○ | × | × | × | × | × | × | × |
| 6 | MIRROR | ○ | × | ○ | ○ | ○ | × | × | × |
| 7 | 2F WIPER | ○ | × | × | × | × | ○ | × | × |
| 8 | 2F WIPER SWITCH | ○ | × | × | × | × | × | × | × |
| 9 | VENTILATING FAN | ○ | × | × | × | × | × | ○ | ○ |
| 10 | CONTROL SWITCH FOR VENTILATING FAN | ○ | × | × | × | × | × | × | × |
| 11 | TV SLIDER | ○ | × | × | × | × | × | × | × |
| 12 | SWING ANTENNA | ○ | × | × | × | × | × | × | × |
| 13 | BATTERY RELAY | ○ | × | × | × | × | × | × | × |
| 14 | DOOR / EMERGENCY BELL | ○ | × | × | × | × | × | × | × |
| 15 | CLOCK | ○ | × | × | × | × | × | × | × |
| 16 | TRUNK LAMP | ○ | × | × | × | × | × | × | × |

FIG. 19

[LOOK-UP TABLE CONTAINING SWITCH POSITIONS THAT CAN BE SELECTED EVERY TYPE OF THE CONTROL SWITCH]
(○: CAN BE SELECTED, ×: CANNOT BE SELECTED)

| TYPE OF SWITCH / SWITCH POSITIONS | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 OPERATION SWITCH | ○ | ○ | ○ | ○ | ○ | ○ | ○ | ○ | ○ | ○ | ○ | ○ | ○ | ○ | ○ | ○ | ○ | ○ | ○ |
| 2 RELAY COIL | ○ | ○ | ○ | ○ | ○ | ○ | ○ | ○ | ○ | ○ | ○ | ○ | ○ | ○ | ○ | ○ | ○ | ○ | ○ |
| 3 INCANDESCENT LAMP DIMMING | ○ | ○ | ○ | ○ | ○ | ○ | ○ | ○ | ○ | ○ | ○ | ○ | ○ | ○ | ○ | × | × | × | × |
| 4 FLUORESCENT LAMP DIMMING | ○ | ○ | ○ | ○ | ○ | ○ | ○ | ○ | ○ | ○ | ○ | ○ | ○ | × | × | × | × | × | × |
| 5 POWER SOURCE FOR FLUORESCENT LAMP | × | × | × | × | × | × | × | × | × | × | × | × | × | × | × | × | × | × | × |
| 6 MIRROR | × | × | × | × | × | × | × | × | × | × | × | × | × | × | × | × | × | × | × |
| 7 2F WIPER | × | × | × | × | × | × | × | × | × | × | × | × | × | × | × | × | × | × | × |
| 8 2F WIPER SWITCH | ○ | ○ | ○ | ○ | ○ | ○ | ○ | ○ | ○ | ○ | ○ | ○ | ○ | ○ | ○ | × | × | × | ○ |
| 9 VENTILATING FAN | ○ | ○ | ○ | ○ | ○ | ○ | ○ | ○ | ○ | ○ | ○ | ○ | ○ | ○ | ○ | × | × | × | ○ |
| 10 CONTROL SWITCH FOR VENTILATING FAN | ○ | ○ | ○ | ○ | ○ | ○ | ○ | ○ | ○ | × | ○ | ○ | ○ | ○ | ○ | × | × | × | ○ |
| 11 TV SLIDER | ○ | ○ | ○ | ○ | ○ | ○ | ○ | ○ | × | × | ○ | ○ | ○ | ○ | ○ | × | × | × | ○ |
| 12 SWING ANTENNA | ○ | ○ | ○ | ○ | ○ | ○ | ○ | ○ | × | × | ○ | ○ | ○ | ○ | ○ | × | × | × | ○ |
| 13 BATTERY RELAY | × | × | × | × | × | × | × | × | × | × | × | × | × | × | × | ○ | ○ | ○ | × |
| 14 DOOR/EMERGENCY BELL | × | × | × | × | × | × | × | × | × | × | × | × | × | × | × | ○ | ○ | ○ | × |
| 15 CLOCK | × | × | × | × | × | × | × | × | × | × | × | × | × | × | × | × | × | × | × |
| 16 TRUNK LAMP | × | × | × | × | × | × | × | × | × | × | × | × | × | × | × | × | × | × | × |

FIG. 20 [LOOK-UP TABLE CONTAINING TERMINALS THAT CAN BE SELECTED EVERY TYPE OF THE CONTROL SWITCH]
(○: CAN BE SELECTED, ×: CANNOT BE SELECTED)

| | TYPE OF SWITCH TERMINALS | OPERATION SWITCH | RELAY COIL | INCANDESCENT LAMP DIMMING | FLUORESCENT LAMP DIMMING | POWER SOURCE FOR FLUORESCENT LAMP | MIRROR | 2F WIPER | 2F WIPER INTERLOCK SWITCH | VENTILATING FAN |
|---|---|---|---|---|---|---|---|---|---|---|
| 153 | A1705 | ○ | ○ | ○ | | | | | ○ | ○ |
| 154 | A1706 | ○ | ○ | ○ | | | ○ | ○ | ○ | ○ |
| 155 | A1707 | ○ | ○ | ○ | ○ | ○ | ○ | ○ | ○ | ○ |
| 156 | A1708 | ○ | ○ | ○ | ○ | ○ | ○ | ○ | ○ | ○ |
| 157 | A1801 | ○ | ○ | ○ | ○ | ○ | ○ | ○ | ○ | ○ |
| 158 | A1802 | ○ | ○ | ○ | ○ | ○ | ○ | ○ | ○ | ○ |
| 159 | A1803 | ○ | ○ | ○ | ○ | ○ | ○ | ○ | ○ | ○ |
| 160 | A1804 | ○ | ○ | ○ | ○ | ○ | ○ | ○ | ○ | ○ |
| 161 | A1805 | ○ | ○ | ○ | ○ | ○ | ○ | ○ | ○ | ○ |
| 162 | A1806 | ○ | ○ | ○ | ○ | ○ | ○ | ○ | ○ | ○ |
| 163 | A1807 | ○ | ○ | ○ | ○ | ○ | ○ | ○ | ○ | ○ |
| 164 | A1808 | ○ | ○ | ○ | ○ | ○ | ○ | ○ | ○ | ○ |
| 165 | A1901 | ○ | ○ | ○ | ○ | ○ | ○ | ○ | ○ | ○ |
| 166 | A1902 | ○ | ○ | ○ | ○ | ○ | ○ | ○ | ○ | ○ |
| 167 | A1903 | ○ | ○ | ○ | ○ | ○ | ○ | ○ | ○ | ○ |
| 168 | A1904 | ○ | ○ | ○ | ○ | ○ | ○ | ○ | ○ | ○ |
| 169 | A1905 | ○ | ○ | ○ | ○ | ○ | ○ | ○ | ○ | ○ |
| 170 | A1906 | ○ | ○ | ○ | ○ | ○ | ○ | ○ | ○ | ○ |
| 171 | A1907 | ○ | ○ | ○ | ○ | ○ | ○ | ○ | ○ | ○ |
| 172 | A1908 | ○ | ○ | ○ | ○ | ○ | ○ | ○ | ○ | ○ |
| 173 | A2001 | × | × | × | × | × | × | × | × | × |

| CONTROL-SPECIFICATION INFORMATION ADDRESS | SET TERMINAL ADDRESS |
|---|---|
| 00, 01 | A0901, A0904 |
| 02, 03 | A0902, A0905 |
| 04, 05 | A0903, A0908 |
| 06, 07 | A0906, A0907 |
| 08, 09 | A1001, A1004 |
| 0A, 0B | A1002, A1005 |
| 0C, 0D | A1003, A1008 |
| 0E, 0F | A1006, A1007 |
| 10, 11 | A1101, A1104 |
| 12, 13 | A1102, A1105 |
| 14, 15 | A1103, A1108 |
| 16, 17 | A1106, A1107 |
| 18, 19 | A1204, A1205 |
| 1A, 1B | A1206 A1207, A1208 |
| 1C, 1D | A0601, A0703 |
| 1E, 1F | B0801, B0804 |
| 20, 21 | B0802, B0805 |

TERMINAL POSITIONS (5 DIGITS DISPLAY)
A 0 3 1 4
→ TERMINAL 14
→ CONNECTOR 3
→ UNIT A

FIG. 22

[LOOK-UP TABLE CONTAINING THE DEFAULT CORRESPONDENCE OF
THE CONTROL-SPECIFICATION INFORMATION ADDRESSES AND THE
TERMINAL POSITIONS THEREOF]

| TERMINAL NO. | TERMINAL NAME | REMARKS |
|---|---|---|
| A0101 | POWER SOURCE | |
| A0102 | CONNECTION CONFIRM SIGNAL INPUT | |
| A0103 | CONTROL OUTPUT | |
| A0104 | GND | |
| A0201 | RIGHT MIRROR FACE CONTROL (UP/DOWN) | |
| A0202 | LEFT (-RIGHT ?) MIRROR FACE CONTROL (RIGHT/LEFT) | |
| A0203 | ROOM MIRROR FACE CONTROL (UP/DOWN) | |
| A0204 | ROOM MIRROR FACE CONTROL (RIGHT/LEFT) | |
| A0205 | GND | |
| A0207 | LEFT MIRROR FACE CONTROL (UP/DOWN) | |
| A0208 | LEFT MIRROR FACE CONTROL (RIGHT/LEFT) | |
| A0209 | MIRROR FACE CONTROL (COM) | |
| A0200 | COMMUNICATION LINE (+) | |
| A0211 | COMMUNICATION LINE (-) | |
| A0212 | POWER SOURCE | |
| A0211 | STEPPED ILLUMINATION LAMP IPS15 | PRESENT FOR SWING DOOR/SPACE FOR FOLDING DOOR |
| A0302 | STEPPED ILLUMINATION LAMP IPS16 | PRESENT FOR FOLDING DOOR/SPACE FOR SWING DOOR |
| A0304 | EMERGENCY BELL (-) | |

CONTROL-SPECIFICATION DESIGN MANAGEMENT SYSTEM USED FOR LOAD CONTROL DEVICES

BACKGROUND OF THE INVENTION

1. Field of the Invention

The present invention relates to a control-specification design management system. A control-specification design management system may be used for load control devices. In the control-specification design management system, each of the load control devices includes a rewritable storage which stores control-specification information. The control-specification information relates to the connection correspondence of control switches, arrayed on an operation panel, to loads as objects to be controlled. Loads are controlled by using load control information based on the control-specification information.

More particularly, the invention relates to a control-specification design management system used for load control devices for vehicles. In the vehicle load control devices, each includes a rewritable storage which stores control-specification information on the connection correspondence between the vehicle's electric components, such as lamps or an air conditioner, which are loads that constitute objects to be controlled, and the plurality of control switches arrayed on the vehicle's operation panel. The vehicle has a master multiplex communication unit for carrying out a process of multiplexing load control information, based on the control-specification information, through a multiplex transmission line. The vehicle also has a plurality of slave multiplex communication units for carrying out a process of multiplexing load control information, based on the control-specification information, through a multiplex transmission line. The control of the loads is accomplished by using the multiplexed load control information, with the master multiplex communication unit being interconnected with the slave multiplex communication units by multiplex transmission lines.

2. Related Art

A control-specification design management system used for load control devices as shown in FIG. 23 is known to the inventors.

As shown, a control-specification design management system 5 is used for load control devices 2. In the system, the control-specification information on the connection correspondence of a plural number of control switches 6a arrayed on an operation panel 6 to loads 3, as objects to be controlled, are respectively stored in the load control devices 2b, which are designed to be exclusively used for those pieces of control-specification information, respectively. Accordingly, the load control devices 2, the number of which is equal to the number of kinds of control-specification information, are provided in the control-specification design management system. The design of the control-specification information is manually performed.

The exclusive load control devices 2 respectively control the loads 3. Loads 3 are each connected to the control units 2 using load control information 1. The load control information is formed on the basis of the control-specification information.

Also in a control-specification design management system 5 used for load control devices 2, each load control device 2 includes a master multiplex communication unit for carrying out a multiplexing process of load control information 1, based on the control-specification information, through a multiplex transmission line 8. Each load control device 2 also includes a slave multiplex communication unit 2b, connected to the master multiplex communication unit, for carrying out a multiplexing process of load control information 1 and for controlling loads 3 by the multiplexed load control information 1.

The respective control-specification information, for each exclusive master multiplex communication unit and each slave multiplex communication unit 2b, are stored. Accordingly, the exclusive master multiplex communication units and the slave multiplex communication units 2b, are provided in equal number to the kinds of the control-specification information. As already mentioned, however, the design of control-specification information is wholly manual.

The exclusive master multiplex communication units of load control devices 2 and the slave multiplex communication units 2b control the loads 3 connected thereto by using the load control information 1, which is based on the control-specification information.

The foregoing arrangement is provided because the control-specification information may be different for every user and every type of motor vehicle.

The load control information 1 includes the details of the control of the loads 3, the types of the loads 3 (e.g., lamps and an air conditioner), and control methods (e.g., the control of light intensities of lamps, and the on/off supply of electric power to the air conditioner).

As described above, in the conventional control-specification design management system, it is necessary to provide the exclusive load control devices (or the exclusive master multiplex communication units and the slave multiplex communication units) of which the number is equal to the number of kinds of the control-specification information. It is difficult to standardize the load control devices in their design. The difficulty of the standardization makes it difficult to improve the productivity and to realize cost reduction.

As referred to above, the design of the control-specification information is done solely by manual work. Because of this, it is difficult to add necessary information to control-specification information that already has been determined. It also is difficult and alter the control-specification information. Accordingly, this makes it difficult to reduce the number of steps in the design process, to improve productivity, and to reduce manufacturing costs. The same problems arise in standardizing the wire harness.

SUMMARY OF THE INVENTION

For the foregoing reasons, an object of the present invention is to provide a control-specification design management system which is capable of readily standardizing the design of the load control devices and the wire harness, and hence reducing the number of steps of the design process, improving productivity, and achieving cost reduction.

In the present invention, in designing the connection correspondence of the control switches to the loads, the control-specification design management system refers to a look-up table or a slip file, prepared in the preceding design, and presents to a designer candidates for the loads that can be controlled when these are connected to the control switches, thereby to impel the designer to select the most suitable candidate from those presented. In this way, the designer forms control-specification information. The contents of the slip file are printed out.

As an aspect of the present invention, there is thus provided a control-specification design management system used for load control devices. Each load control device has a rewritable storage which stores control-specification information on the connection correspondence between a plurality of control switches arrayed on an operation panel, and loads, as objects to be controlled. Each load control device is capable of controlling the loads by using load control information which is based on the control-specification information. The control-specification design management system is characterized in that a look-up table is provided. The look-up table includes the connection correspondence of loads that can be controlled when such loads are connected to the control switches. In designing the connection correspondence of the control switches to the loads, the control-specification design management system refers to the look-up table. The system presents to the designer candidates for the loads that can be controlled when these are connected to the control switches. Thereby, the designer may select the most suitable one from among those presented candidates, thus forming or defining the control-specification information.

According to another aspect of the present invention, there is provided a control-specification design management system used for load control devices each having a rewritable storage which stores control-specification information on the connection correspondence of a plural number of control switches arrayed on an operation panel, and loads as objects to be controlled, and a master multiplex communication unit for carrying out a process of multiplexing load control information based on the control-specification information through a multiplex transmission line, a plural number of slave multiplex communication units for carrying out a process of multiplexing load control information based on the control-specification information through a multiplex transmission line, and being capable of controlling the loads by using the multiplexed load control information, and the master multiplex communication unit being interconnected with the slave multiplex communication units by multiplex transmission lines, the control-specification design management system being characterized in that a look-up table for storing the connection correspondence of the loads that can be controlled when these are connected to the control switches, is provided, and in designing the connection correspondence of the control switches to the loads, the control-specification design management system refers to the look-up table, and presents to a designer candidates for the loads that can be controlled when these are connected to the control switches, to thereby impel a designer to select the most suitable one from among those presented candidates, whereby control-specification information for the load control devices is formed.

According to the present invention, in a system having load control devices, the storage is electrically and removably coupled with the load control devices. According to the present invention, in a system having master and slave multiplex communication units, the storage is electrically and removably coupled with the master multiplex communication unit.

According to the present invention, a slip file is formed using the formed control-specification information, and the contents of the slip file are printed out.

According to the present invention, in designing the connection correspondence between the control switches and the loads, the control-specification design management system may refer not only to the look-up table, but also to the slip file prepared in the preceding design.

As already noted, the designed control-specification information is stored in the rewritable storage. The storage is electrically and removably coupled with the load control device (or the master multiplex communication unit or the slave multiplex communication units, and the designed control-specification information may be transmitted to the device when required. To alter the designed control-specification information, all a designer has to do is to alter only the control-specification information in the storage. Accordingly, in the present invention, there is no need for providing exclusive load control devices (or the exclusive master multiplex communication units or the exclusive slave multiplex communication units) in a number equal to that of the kinds of control-specification information. This is an important advantage over a conventional control-specification design management system. Therefore, the invention makes it easy to standardize the load control devices and the wire harness (viz., to establish standards and manufacture according to those established standards). The reduction of the number of steps of the design process, the productivity improvement, the cost reduction are realized.

The control-specification information may also be altered in a manner that a writing means, externally provided, is directly and electrically connected to the load control device in a state that the storage is electrically and mechanically coupled with the load control devices. The connection correspondence of the loads that can be controlled when these are connected to the control switches, and these control switches are recorded in the look-up table.

In the invention, the connection correspondence stored in the look-up table are the combination of type information indicative of types of the control switches, information of locations of the control switches on the operation board, serial numbers of the control switches, connector array information every load control device (or the plural number of slave multiplex communication units), output terminal information of these connectors, information of the output terminals that may be connected to the loads, control condition information every load (e.g., drive power condition, drive period condition, open or close of the interlocked doors), name information of the loads, information storage date, user codes, serial number of look-up tables, various default setting information, and the like.

Accordingly, it is easy to computerize the design work of the control-specification information, which formerly has been entirely manual work. The addition and alteration of the control-specification information are thus simplified. This leads to the reduction of the number of steps of a design process and the cost to manufacture, and the improvement of the productivity.

In one embodiment, the contents of the slip file may be displayed on the screen of a display means instead of printing out them on the paper.

BRIEF DESCRIPTION OF THE DRAWINGS

FIG. 7 is a diagram showing the data structure of control-specification information used in the control-specification design management system.

FIG. 8 is a diagram showing the data structure of slip file used in the control-specification design management system.

FIG. 13 is a diagram showing an example of a print of the contents (connection correspondence of the control switches to the loads) of a slip file in the control-specification design management system.

FIG. 14 is a diagram showing an example of a print of the contents (connection correspondence of the connector terminals to the control switches) of a slip file in the control-specification design management system.

FIG. 15 is a first look-up table containing types of the control switches used in the control-specification design management system.

FIG. 16 is a second look-up table containing the correspondence of the positions of the control switches to the numbers assigned to the switch positions.

FIG. 17 is a third look-up table containing the control conditions of the loads.

FIG. 18 is a fourth look-up table containing the control conditions that can be selected every type of the control switch.

FIG. 19 is a fifth look-up table containing the positions of the control switches that can be selected every type of the control switch.

FIG. 20 is a sixth look-up table containing the terminals that can be selected every type of the control switch.

FIG. 22 is a look-up table containing the default correspondence of the addresses of the control-specification information formed by the control-specification design management system and the terminal positions thereof.

DETAILED DESCRIPTION OF THE PREFERRED EMBODIMENTS

The preferred embodiments of the present invention will be described with reference to the accompanying drawings.

Arrangement of the Load Control Devices

Figure 1:
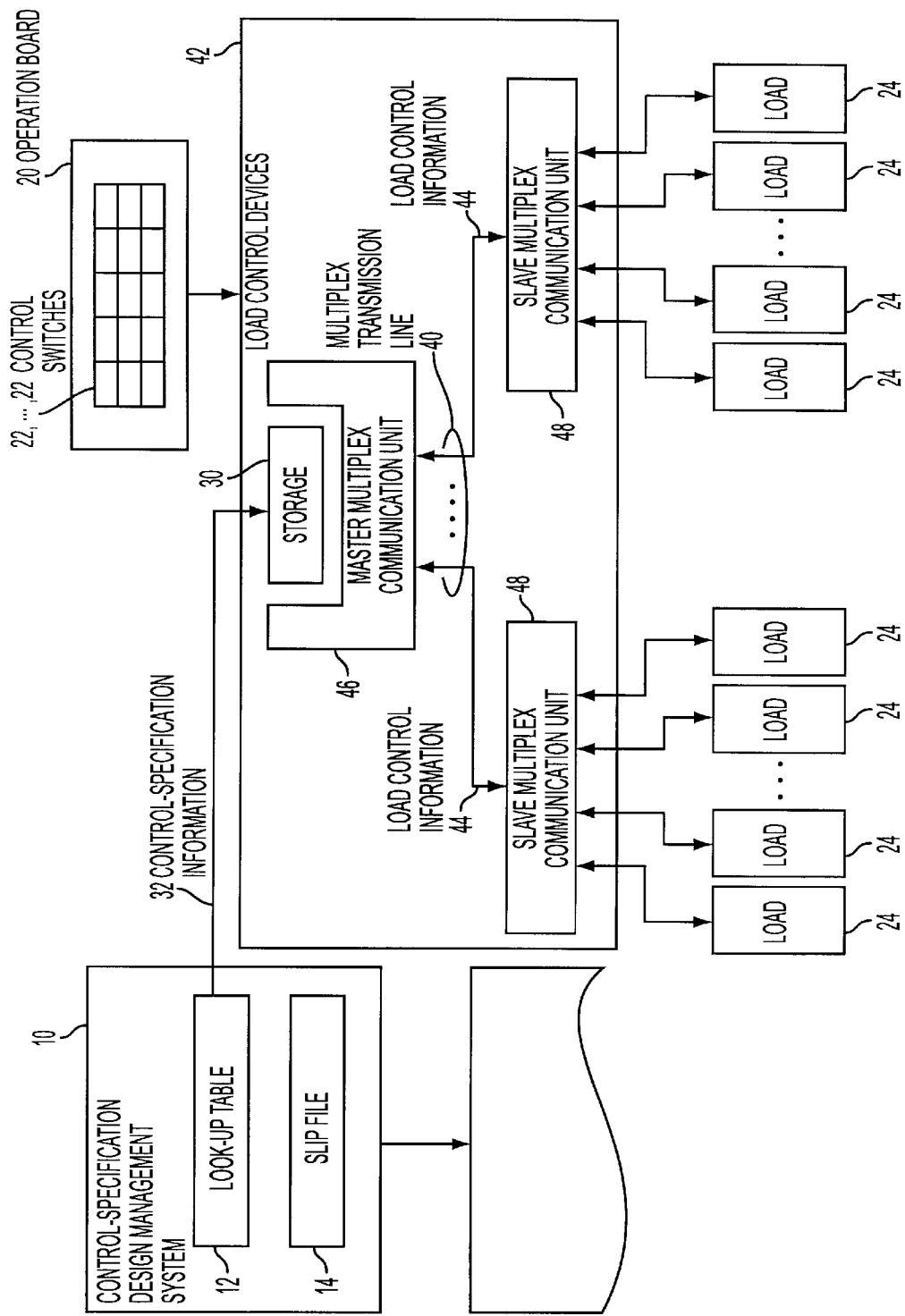
FIG. 1 is a functional block diagram showing an embodiment of a control-specification design management system used for load control devices according to the present invention.
Figure 2:
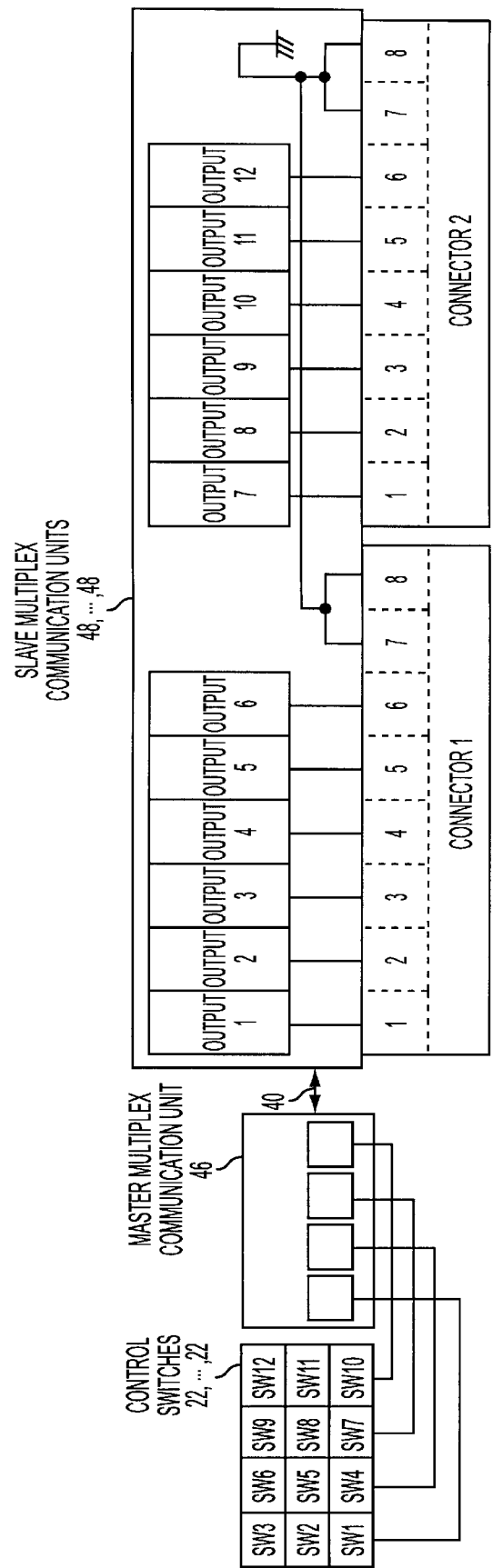
FIG. 2 is a functional block diagram showing load control devices for which the control-specification design management system of the invention is used.

Reference now is made with respect to FIG. 1, in which only one of the plurality of load control devices 42 is depicted. As already mentioned, load control device 42 may be an independent-process load control device or a multiplexing-process load control device. The load control device shown in FIGS. 1 and 2 is an example of a multiplexing-process load control device. It will be understood, however, that the same general principles apply in the case of an independent-process load control device. Since the independent-process load control device can be achieved by simplifying the multiplexing-process load control device, the detailed explanation of this simplified embodiment is generally omitted for the sake of clarity. Thus, the load control devices described below are to be understood to be multiplexing-process load control devices unless otherwise indicated.

In FIGS. 1 and 2, therefore, the load control device 42 is a multiplexing-process load control device. It includes a rewritable storage 30 which stores control-specification information on the connection correspondence of a plurality of control switches 22, arrayed on an operation board 20, to loads 24. The loads 24 are treated as objects to be controlled. Load control device 42 is capable of controlling loads 24 by using load control information 44. The load control information 44 is based on the control-specification information 32.

To be more specific, as shown in FIG. 1, the load control device 42 includes a rewritable storage 30 which stores control-specification information 32. The control-specification information relates to the connection correspondence between control switches 22 and loads 24 defined by the electric components installed in a vehicle. Such loads may include tail lamps, air conditioners, incandescent lamps, fluorescent lamps, mirrors, wipers, ventilating fans, a TV slider, a clock, and the like.

The load control device 42 includes a master multiplex communication unit 46. It will be understood that the master multiplex communication unit 46 belongs to a master system. The master multiplex communication unit 46 carries out a process of multiplexing the load control information 44 through a multiplex transmission line 40 and a plurality of slave multiplex communication units 48. It will be understood that the slave multiplex communication units 48 belong to a slave system. The slave multiplex communication units 48 carry out a process of multiplexing load control information 44 through a multiplex transmission line 40. The slave multiplex communication units 48 are capable of controlling their respective loads 24 using the multiplexed load control information 44. The master multiplex communication unit 46 is interconnected with the slave multiplex communication units 48 by multiplex transmission lines 40.

In the exemplary embodiment being described and shown in FIG. 1, the term "connection" means an electrical connection and implies a state in which signal processing is performed through a metal electrode connector of readout means. It also is possible to make such a connection by using electromagnetic waves (e.g., radio waves or electrostatic induction). It is further possible to make an optical connection using infrared or visible rays.

The operation board 20 may be installed at a proper location, for example, a location close to the driver's seat. The control switches 22, are arrayed on the operation board 20 according to predetermined rules. The control switches 22 include, for example, an on/on switch and a volume switch.

As shown in FIG. 1 or 2, the master multiplex communication unit (master system) 46 and the plural number of slave multiplex communication units (slave system) 48 are interconnected by the multiplex transmission lines 40.

The load control information 44 has the details relating to the control of the loads 24. In particular, the load control information 44 contains information about the types of the loads (e.g., tail lamps, air conditioner, etc.), and about the appropriate load control methods (e.g., the control of periods of flashing of the tail lamps, light intensities of lamps, turning on and off the lamps simultaneously with the opening/closing of doors, and the control of the supply of electric power to the air conditioner).

In the present embodiment, the word "vehicle" means motor vehicles, for example, buses and automobiles, and electric cars, airplanes, ships, and the like. More broadly, however, the invention involves systems with load control devices installed in machinery, for controlling various loads.

The master multiplex communication unit 46 contains a communication interface (I/F) circuit, through which load control information 44 is transferred to and from the slave multiplex communication units 48 by way of the multiplex transmission lines 40 (viz., a multiple communication is performed). The master multiplex communication unit may thus have an input I/F circuit connected to the control switches 22. The master multiplex communication unit may also have, for example, a ROM (read only memory) for storing preset control programs (including a communication protocol for multiplex transmission) and fixed data. The master multiplex communication unit may further include a temporary storage (RAM) (random access memory) used as a work area in which load control information 44 is developed when a preset job is executed under a control program. The master multiplex communication unit may have a metal electrode connector with which the storage 30 makes contact when inserted to read load control information 44 out of the storage 30. As well, the master multiplex communication unit may include an internal timer used for a multiplexing process when trouble happens in a communication mode. Also, the master multiplex communication unit may have a CPU for executing a multiplexing process and the like. An output I/F circuit of the master multiplex communication unit includes a diagnostic output terminal for producing a signal indicative of trouble of the load.

It will be appreciated that, although communication between the master multiplex communication unit and the removable storage is described as being performed through a metal electrode connector, such communication may similarly be effected using electromagnetic waves, or via an optical connection using infrared or visible rays.

The slave multiplex communication units 48, of the load control device 42 shown in FIGS. 1 or 2 are installed in a proper location of the vehicle (for example, the rear side of the ceiling, under the floor, or a location near the driver's seat). Each of the slave multiplex communication units 48, includes a communication I/F circuit, through which load control information 44 is transferred to and from the master multiplex communication unit 46 by way of the multiplex transmission lines 40 (viz., a multiple communication is performed), an input I/F circuit connected to a plural number of sensors (e.g., thermal sensor), for example, power control means (e.g., IPS) for controlling the loads 24, (e.g., tail lamps, motors, and air conditioner) and switching means (for example, relays), connectors for the power control means and the switching means, a ROM for storing preset control programs (including a communication protocol for multiplex transmission) and fixed data, a temporary storage (RAM) used as a work area in which load control information 44 is developed when a preset job is executed under a control program, a nonvolatile memory (EEPROM in the embodiment) for storing load control information 44, an internal timer used for a multiplexing process when trouble happens in a communication mode, and a CPU for executing a multiplexing process and the like.

Connector 1 and connector 2 are used for the slave multiplex communication units 48, and each connector is provided with eight terminals (terminals 1 to 8). The output terminals of the connectors of the slave multiplex communication units 48 are thereby electrically connected to the loads 24.

The storage 30 for storing control-specification information 32 is of the rewritable type, and is electrically and removably coupled with the master multiplex communication unit 46. In the embodiment, a nonvolatile memory, for example, an EEPROM, is used for the storage 30.

The storage 30 is not limited to the nonvolatile memory, but may be any type of storing means if it allows load control information 44 to be updated and to be stored at least a preset number of times. This type of storing means includes a magnetic recording medium and a magneto-optical storing means, both being rewritable or reprogrammable. The magnetic recording media are, for example, magnetic cards, magnetic discs (e.g., removable hard discs, floppy discs and bubble memories), and the magneto-optical storing means is, for example, MO discs.

Arrangement of the Control-specification Design Management System and Look-up Table The arrangement of the control-specification design management system 10 which is the embodiment of the present invention will be described.

The control-specification design management system 10 used for the load control devices 42, includes a look-up table 12 storing the connection correspondence of the loads 24, that can be controlled when these are connected to the control switches 22.

In the embodiment of the present invention, the look-up table 12 is stored in a nonvolatile memory, and the memory is set to the control-specification design management system 10.

The look-up table of the presently-described embodiment actually has seven look-up tables 12. Those look-up tables 12 are: a first look-up table 12 (FIG. 15) containing types of the control switches 22, a second look-up table 12 (FIG. 16) containing the correspondence of the positions of the control switches 22, to the numbers assigned to the positions thereof, a third look-up table 12 (FIG. 17) containing the control conditions of the loads 24, a fourth look-up table 12 (FIG. 18) containing the control conditions that can be selected for every type of control switch 22, a fifth look-up table 12 (FIG. 19) containing the positions of the control switches 22, that can be selected for every type of control switch 22, a sixth look-up table 12 (FIG. 20) containing the terminals that can be selected for every type of control switch 22, and a seventh look-up table 12 (FIG. 22) containing the correspondence of the addresses of the formed control-specification information 32 and the terminal positions.

The control-specification design management system 10 is used for designing and managing the control-specification information 32 used for the load control devices 42, for the multiplexing process. In designing the connection correspondence of the control switches 22 to the loads 24, the control-specification design management system 10 refers to the look-up table 12, and presents to the designer candidates (i.e., candidate switches) for the loads 24, that can be controlled when these are connected to the control switches 22, thereby to impel the designer to select the most suitable one from among those presented candidates. In this way, he forms control-specification information 32 for every slave multiplex communication unit 48, with the aid of the control-specification design management system 10. To this end, the CPU, as a key part for operation, and the storage means (magneto-optical or magnetic storing means) for storing the look-up tables 12, are incorporated into the control-specification design management system 10, coupled with the master multiplex communication unit 46, and the storage 30.

Figure 21:
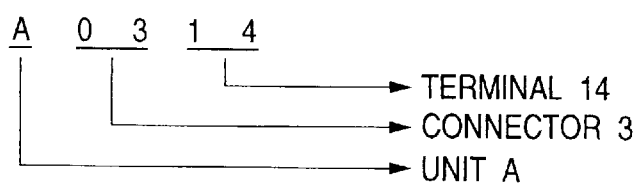
FIG. 21 is a table showing an example of control-specification information formed in the control-specification design management system.
Figure 23:
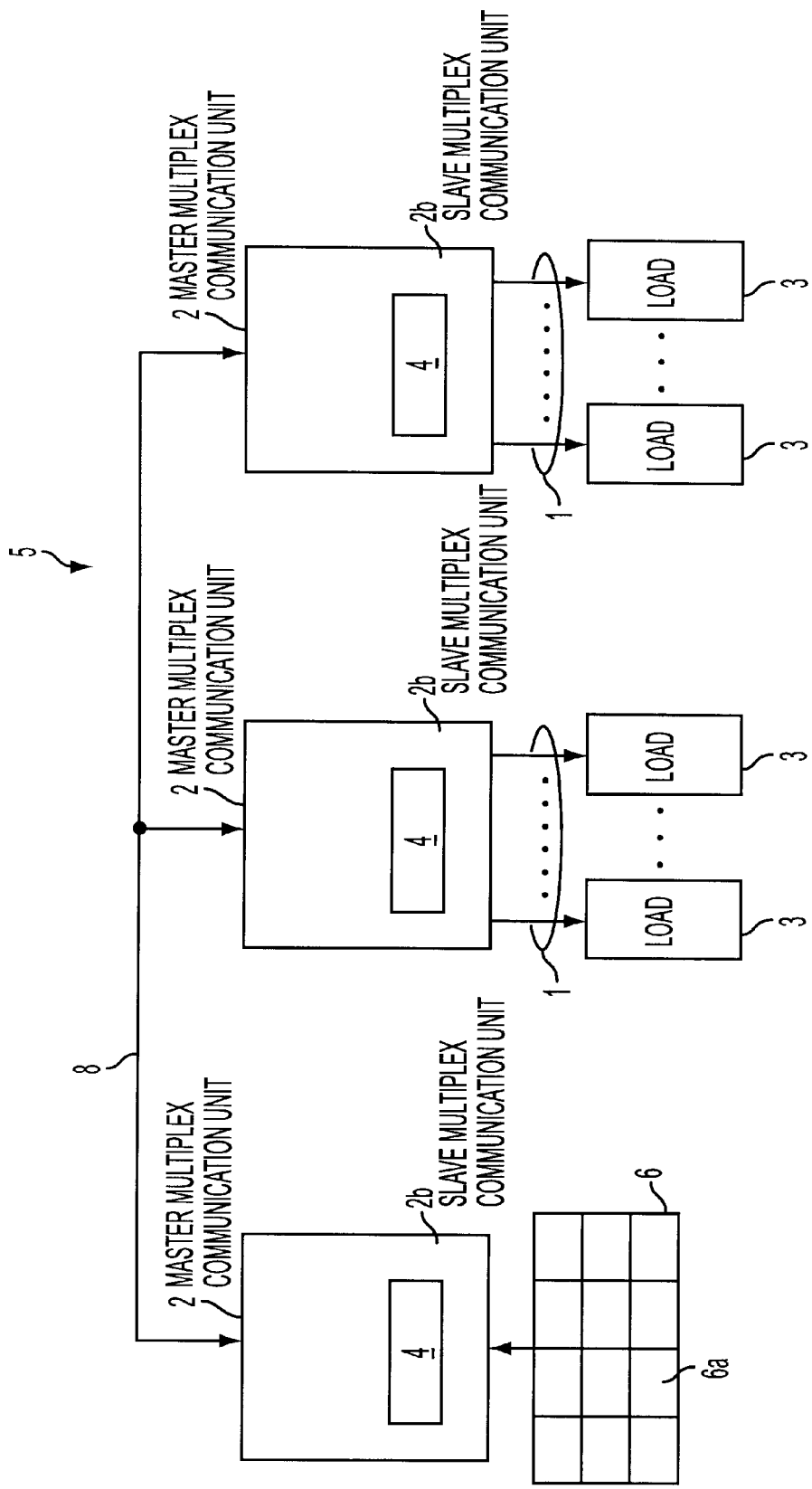
FIG. 23 is a functional block diagram showing a conventional control-specification design management system used for load control devices.

The data structures (called data formats) of the control-specification information 32 prepared for each of the slave multiplex communication units 48, are shown in FIGS. 7 and 21. The data format shown in FIG. 7 is described in a manner that designers and workers can easily understand it. The data format shown in FIG. 21 is described in a manner such that the computer resource, for example, the CPU as a key part for operation, can easily interpret and execute it. Both the data structures have the same meaning.

The control-specification design management system CPU forms a slip file 14 using the formed control-specification information 32, and includes a printing means such as a laser printer, a thermal transfer printer, an ink jet printer, a discharging printer, or a thermal printer. The data structure, or data format, of the slip file 14 is shown in FIG. 8. The printer may be substituted by a display.

In designing the connection correspondence of the control switches 22, to the loads 24, the CPU refers to the look-up table 12, or to a slip file 14 that was prepared in the preceding design. The CPU presents to a designer candidates for the loads 24 that can be controlled when these are connected to the control switches 22, to thereby impel the designer to select the most suitable one from among those presented candidates, whereby control-specification information 32 is formed. To this end, the control-specification design management system 10 is provided with storing means for storing the slip file 14 prepared in the preceding design.

In addition to the CPU and the storing means, the control-specification design management system 10 further includes an I/F circuit for writing the control-specification information 32 to the storage 30, a printer I/F circuit for printing the slip file 14, a ROM for storing preset control programs and fixed data (e.g., a firmware program), a temporary storing means (RAM) used as a work area when preset jobs are executed by control programs, and a metal electrode connector to which the storage 30 (or the connector connected to the storage 30) is put to read the control-specification information 32.

The slip file 14 may be formatted as the "Switch Layout Tablet" and "Terminal Layout Table" shown in FIGS. 13 and 14.

Operation of the Load Control Devices

The operation of the load control devices 42, to which the control-specification design management system 10 is applied in its use, will now be described.

The load control devices 42 may be independent-process load control devices or multiplexing-process load control devices for, e.g., motor vehicles. Either type of load control device is capable of randomly reading the control-specification information 32 out of the storage 30. The data formats of the control-specification information 32 stored in storage 30 are shown in FIGS. 7 and 21. The human-readable data format shown in FIG. 7 has a meaning which is embodied in the computer-useable data format shown in FIG. 21.

When any of the control switches 22 arrayed on the operation panel 20 is turned on, the load control devices 42 may execute the control of the loads 24 by using the load control information 44. It will be recalled that the load control information 44 is based on the control-specification information 32 that is read out of the storage 30.

When the load control devices 42 are multiplexing-process load control devices, the master multiplex communication unit 46 and the plurality of the slave multiplex communication units 48 are each capable of carrying out a process of multiplexing load control information 44 through the multiplex transmission line 40. In the present embodiment, optical fiber is used for the multiplex transmission lines 40.

The communication I/F circuit contained in the master multiplex communication unit 46 allows the load control information 44 to be transferred to and from the slave multiplex communication units 48 by way of the multiplex transmission lines 40. Namely, the communication I/F circuit allows a multiple communication. The input I/F circuit controls the input control of the switches 22. The ROM stores preset control programs (including a communication protocol for multiplex transmission) and fixed data (e.g., firmware program). The temporary storage (RAM) is used as a work area in which load control information 44 is developed when a preset job is executed under a control program. The metal electrode connector is used for the electrical mounting of the storage 30 (nonvolatile memory). The internal timer enables a multiplexing process when a trouble happens in a communication mode. The CPU executes a multiplexing process and the like.

Similarly, the slave multiplex communication units 48 are capable of controlling the loads 24 by using the multiplexed load control information 44.

The communication I/F circuit contained in each of the slave multiplex communication units 48, allows the load control information 44 to be transferred to and from the slave multiplex communication units 48, therethrough by way of the multiplex transmission lines 40. The input I/F circuit allow the inputting of signals from a plurality of sensors (e.g., thermal sensors). The connector electrically connects power control means for controlling the loads 24 and switching means (for example, relays). The ROM stores preset control programs (including communication protocol for multiplex transmission) and fixed data (e.g., firmware program).

The temporary storage (RAM) is used as a work area in which load control information 44 is developed when a preset job is executed under a control program. The nonvolatile memory stores load control information 44. The internal timer enables a multiplexing process when a trouble happens in a communication mode. The CPU executes a multiplexing process in the slave system and the like.

Connectors 1 and 2 are used for the slave multiplex communication units 48, and each connector is provided with eight terminals (terminals 1 to 8).

Control-specification Information and Load Control Information

The "load control information 44" as the details of the control of the loads 24, as shown in FIG. 17, 18 or 19, contains information relating to the types of loads 24, (e.g., lamps and an air conditioner as electric components installed in the vehicles), and load control methods (e.g., the control of light intensities of lamps, the control of turning on and off the lamps simultaneously with the opening/closing of doors, and the control of the supply of electric power to the air conditioner power on and off).

The storage 30 is electrically and removably coupled with the independent-process load control device 42, or the multiplexing-process load control device (specifically, the master multiplex communication unit 46) 42, and stores control-specification information 32 (FIGS. 7 and 21) on the connection correspondence of a plural number of control switches 22, arrayed on an operation panel 20, and loads 24, as objects to be controlled.

The control-specification information 32 (FIGS. 7 and 21) on the connection correspondence is information for specifying the loads 24, to be driven when the control switches 22, are turned on.

The storage 30 that stores the control-specification information 32 (FIGS. 7 and 21) is of the rewritable type. To alter the control-specification information 32 in the storage, the storage 30 is removed from the load control device 42, and the information is altered.

Thus, designed control-specification information 32 (FIGS. 7 and 21) is stored in the rewritable storage 30. The storage 30 is electrically and removably coupled with the load control device 42, (or the master multiplex communication unit 46 or the slave multiplex communication units 48, ), and the designed control-specification information 32 may be transmitted to the device when required. To alter the designed control-specification information, all a designer has to do in to alter only the control-specification information 32 in the storage 30. Accordingly, in the present invention, there is no need of providing the exclusive load control devices 42, or the exclusive master multiplex communication units 46 or the exclusive slave multiplex communication units 48, of which the number is equal to the number of kinds of the control-specification information 32, although such number of exclusive load control devices are required in the conventional control-specification design management system 10. Therefore, the invention makes it easy to standardize the load control devices and the wire harness. The reduction of the number of steps of the design process, the productivity improvement, the cost reduction are realized.

The control-specification information 32 (FIGS. 7 and 21) may also be altered in manner that a writing means, externally provided, is directly and electrically connected to the load control device 42, in a state that the storage 30 is electrically and mechanically coupled with the load control devices 42.

As shown in FIGS. 15 to 20, the connection correspondence of the loads 24, that can be controlled when these are connected to the control switches 22, and these control switches are recorded in the look-up tables 12. In the present embodiment, the look-up tables 12 are stored in a nonvolatile memory contained in the control-specification design management system 10.

The connection correspondence stored in the look-up table 12 are the combination of type information indicative of types of the control switches 22, information of locations of the control switches 22, on the operation board 20, serial numbers of the control switches 22, connector array information every load control device 42 (or the plural number of slave multiplex communication units 48), output terminal information of these connectors, information of the output terminals that may be connected to the loads 24, control condition information every load 24, (e.g., drive power condition, drive period condition, open or close of the interlocked doors), name information of the loads 24, information storage date, user codes, serial number of look-up tables, various default setting information, and the like.

In designing the connection correspondence of the control switches 22 to the loads 24, the CPU refers to the connection correspondence stored in the look-up table 12, which is stored in a nonvolatile memory contained in the control-specification design management system 10, and presents to a designer candidates for the loads 24 that can be controlled when these are connected to the control switches 22.

In this case, the CPU may refer to the look-up table 12 (FIG. 22) containing the default correspondence of the addresses of the control-specification information 32 and the terminal positions thereof, in addition to the connection correspondence stored in the look-up table 12, which is stored in a nonvolatile memory.

While seeing the candidates, a designer selects the most suitable one from among those presented candidates.

Accordingly, it is easy to computerize the design work of the control-specification information 32 (FIGS. 7 and 21), which is entirely based on the manual work. The addition and alteration of the control-specification information are easy. This leads to the reduction of the number of steps of a design process and the cost to manufacture, and the improvement of the productivity.

Slip File

The CPU of the control-specification design management system 10 is capable of forming a slip file 14 using the formed control-specification information 32 (FIGS. 7 and 21), and printing out the contents of the slip file 14 by a printing means (a printer in the embodiment (e.g., a laser printer, a thermal transfer printer, an ink jet printer, a discharging printer, or a thermal printer). The slip file 14 may be printed out in the form of "Switch Layout Table" (FIG. 13) and "Terminal Layout List" (FIG. 14). Also, the slip file may be displayed on a display instead of being printed out.

In the present embodiment, the thus-designed slip file 14 is stored in a means for storing, or storing means. Examples of a means for storing the slip file include magneto-optical storing means or a magnetic storing means. The data format of the designed slip file 14 that is stored in a storing means is shown in FIG. 8.

In designing the connection correspondence of the control switches 22 to the loads 24, the CPU refers to the connection correspondence stored in the look-up table 12 stored in a nonvolatile memory of the control-specification design management system 10, or to a slip file 14 which was prepared in the preceding design and which was stored in a storing means of the control-specification design management system 10. Thus, the designer may be presented with candidate switches based not only on the defaults of the look-up table 12, but also the settings used in a previous design session as recorded in slip file 14. As has already been described, the designer, while seeing the candidates, selects the most suitable one from among those presented. In this way, he designs control-specification information 32.

The CPU as a key part for operation in the control-specification design management system 10 used for the load control devices 42, may print out or store the contents of the formed slip file 14 by the printing means. Accordingly, the addition and alteration of the control-specification information 32 are easy, resulting in the reduction of the number of steps of a design process and the coat to manufacture, and the improvement of the productivity.

Also in this case, the control-specification design management system 10 is capable of forming a slip file 14 using the formed control-specification information 32, and printing out the contents of the slip file 14. The contents of the slip file 14 may be displayed on the screen of a display means instead of printing out them on the paper.

More Detailed Description of Control-specification Design Management System

The operation of the control-specification design management system 10 of the present invention will be described in more detail with reference to FIGS. 3, 4, 9, 10, 11 and 12.

Figure 11:
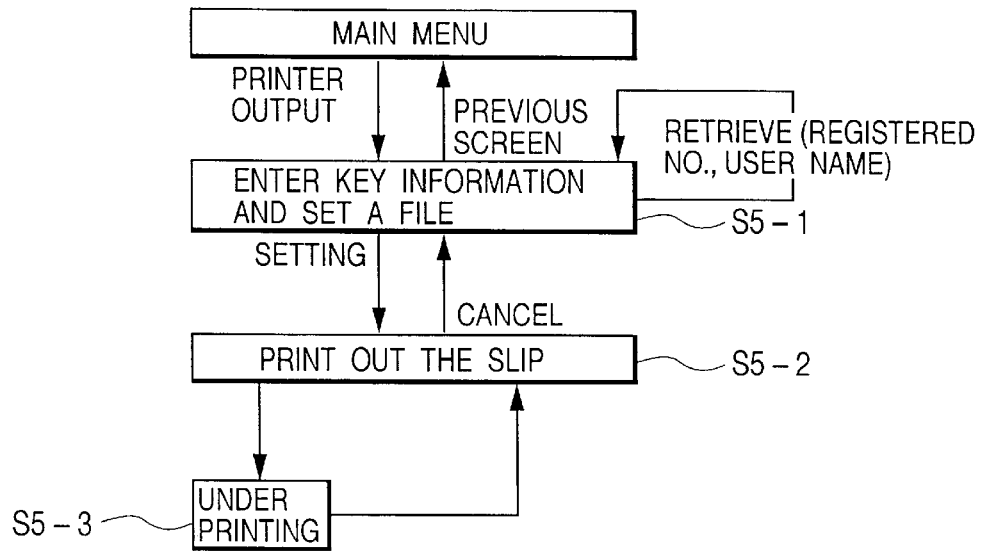
FIG. 11 is a flow chart showing a print mode for printing the contents of the slip file in the control-specification design management system.
Figure 12:
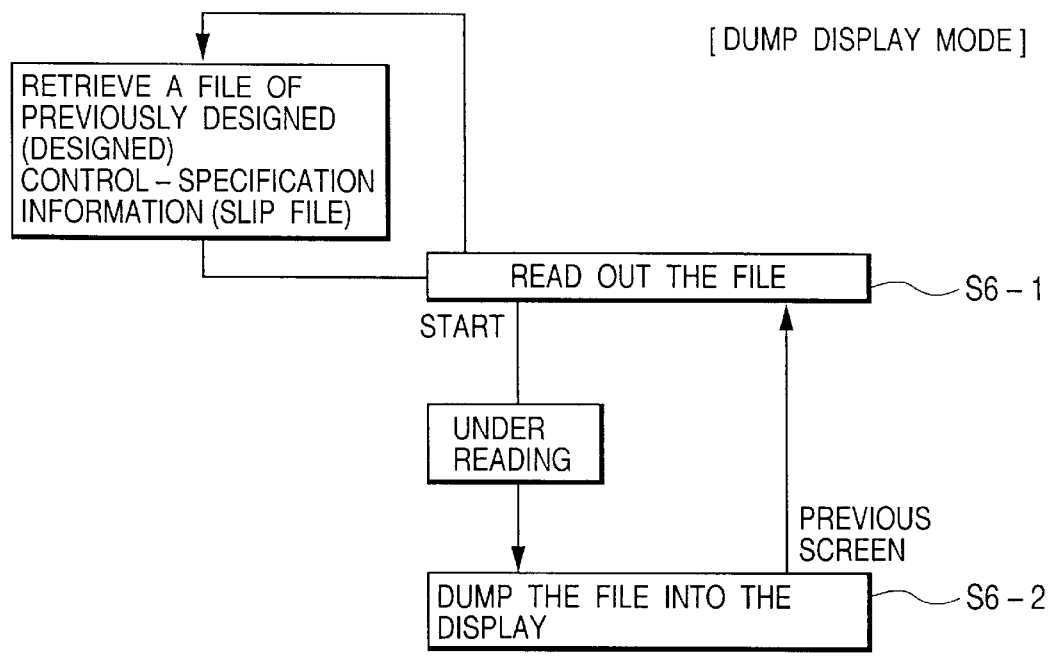
FIG. 12 is a flow chart showing a dump display mode for dumping control-specification information that is stored in the storage.

The control-specification design management system 10 is operable in any of the following modes: a generation mode for generating control-specification information 32 (or slip file 14) (FIG. 3), a storage mode for storing control-specification information 32 (or slip file 14) (FIG. 4), a rewrite mode for rewriting control-specification information 32 (or slip file 14) (FIG. 9), a reference (retrieval) mode for referring to control-specification information 32 (or slip file 14) (FIG. 10), a print mode for printing the contents of the slip file 14 (FIG. 11), and a dump display mode for dumping control-specification information 32 (or slip file 14) (FIG. 12).

An operator may select a desired mode from among the foregoing modes on a main menu. The functions and operations of those modes will now be described.

Figure 3:
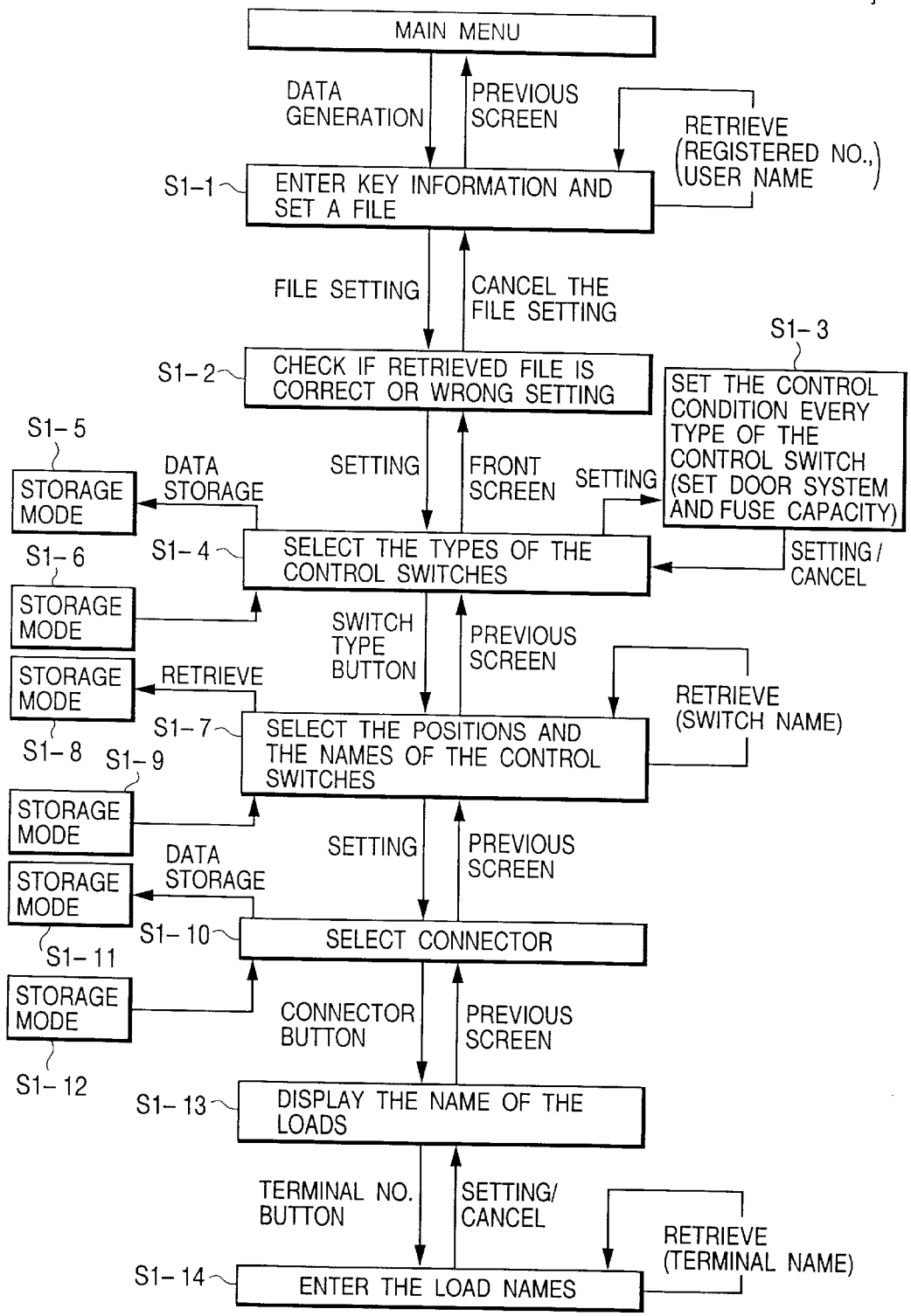
FIG. 3 is a flow chart showing a generation mode for generating control-specification information in the control-specification design management system.

1) Generation Mode for Generating Control-Specification Information 32 or Slip File 14 (FIG. 3)

Figure 5:
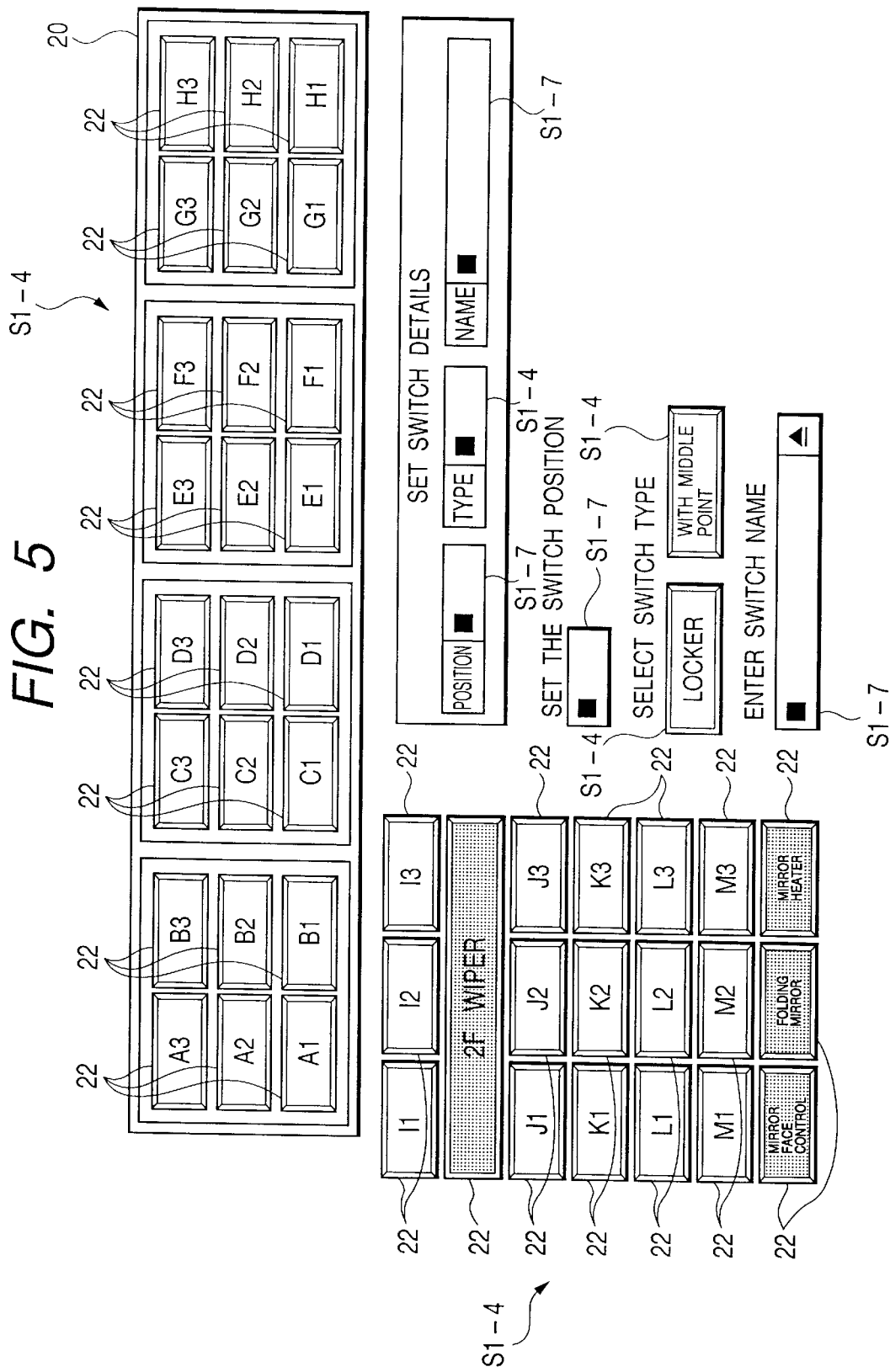
FIG. 5 is a diagram showing an example of a display showing the setting of control switches in a generation mode for generating control-specification information.
Figure 6:
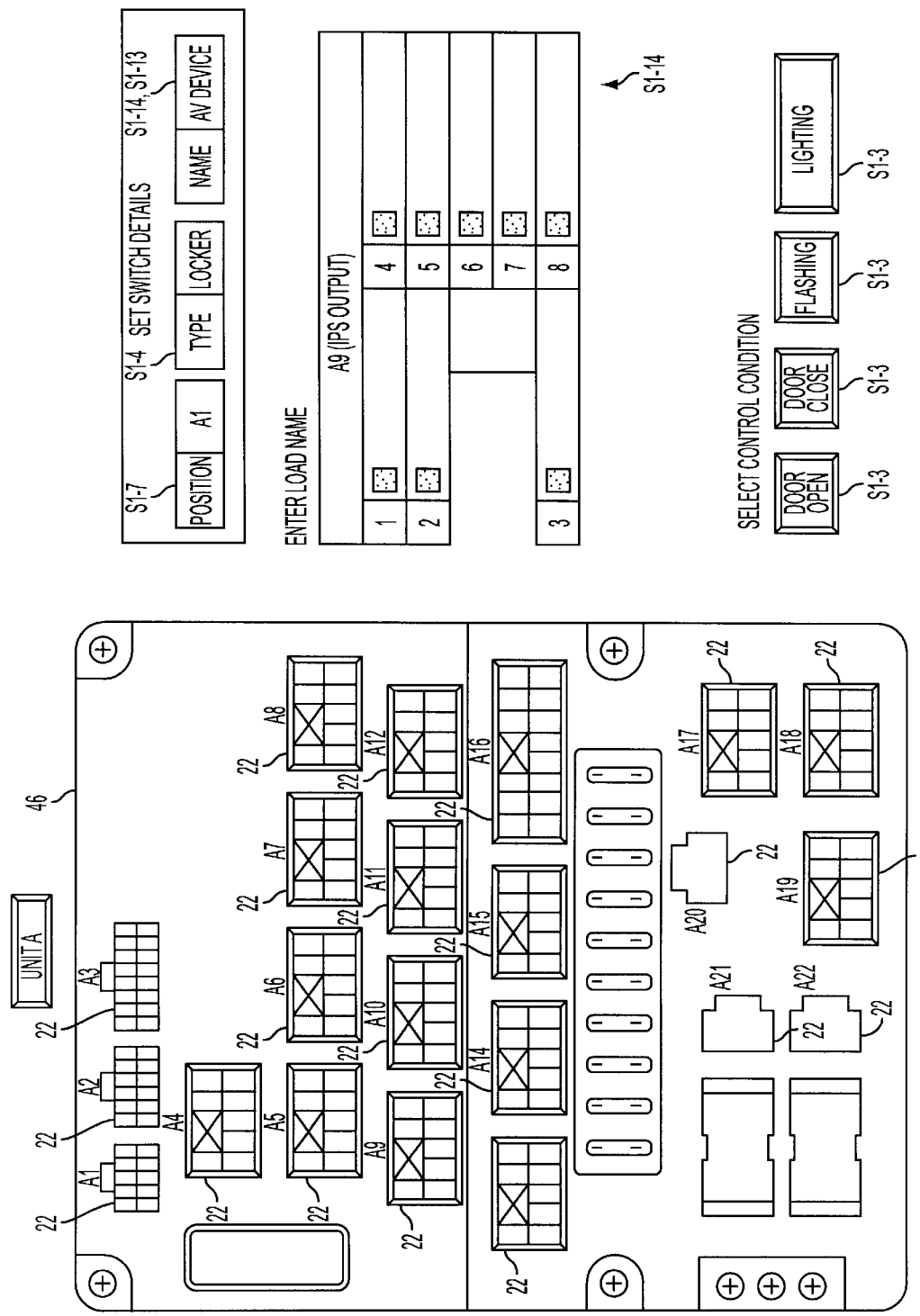
FIG. 6 is a diagram showing an example of a display showing the setting of loads in the control-specification information generation mode.

The graphics and tables as shown in FIGS. 5 and 6 are used for setting up a generation mode for generating control-specification information 32 or slip file 14, for the enhancement of the user interface.

The control-specification design management system 10 refers to the connection correspondence stored in the look-up table 12 and visually presents to a designer candidates for the loads 24, that can be controlled when these are connected to the control switches 22. In this case, only the candidates may be highlighted for emphasizing them. It will be recalled that look-up table 12 actually comprises several tables, such as those shown in FIGS. 15–22.

After the generation mode is selected on the main menu, the system control in the control-specification design management system 10 requests the user to enter key information, such as the date of recording, a user code or name, a serial number or registered number of the user, and the like. The system control executes a retrieval process according to the key information entered, and retrieves the file of the control-specification information 32 or slip file 14 previously designed (step S1-1).

The system control checks if the retrieved file is correct or wrong (step S1-2). If a desired file is hit, processing continues with step S1-4.

In this step, the designer sets the types of the control switches 22 (step S1-4). At this time, the control condition is set for every type of control switch 22 (step S1-3). In setting the control conditions, the look-up table 12, shown in FIG. 17, is referred to.

A file to select the types of the control switches 22 presently or previously designed may be retrieved and used (step S1-6). The default look-up table 12, as shown in FIG. 22, may also be referred to.

In selecting the types of the control switches 22, the look-up tables 12 shown in FIGS. 15 to 21 are referred to. That is, a defined control switch will have one of the pre-defined types included in the look-up table (see FIG. 15). To illustrate, consideration is now given to hypothetical switch SW1. When defined, switch SW1 will be designated as having a control switch type that the designer selects from the types of switches defined in the look-up table.

As was earlier mentioned, the switch type relates to the permitted control conditions that may be defined for it. Thus, the type of switch is determined for each switch, and then the control conditions are selected. As FIG. 18 shows, the designer's choice of a control condition for a particular switch is constrained by the look-up table. The control-specification design management system may preclude the designer from selecting a control condition for a switch where the look-up table indicates that such a control condition may not be selected based on the type of the switch.

Following the process of selecting the types of the control switches 22, the system control jumps to the storage mode where the data representative of the types of the control switches is stored (step S1-5).

Processing then continues to the process of selecting the positions and the names of the control switches 22 (step S1-7). In executing the process of selecting the positions and the names of the control switches 22, the look-up tables 12 shown in FIGS. 15 to 21 are referred to. The default look-up table 12 as shown in FIG. 22 may also be referred to. The files to select the positions and the names of the control switches 22, presently or previously designed may be retrieved and used (step S1-9). The default look-up table 12 as shown in FIG. 22 may also be referred to.

In other words, the designer relates each defined switch to a position of a button or the like on a control panel 20. FIGS. 5 and 16 illustrate this point. FIG. 5 shows a control panel 20. Reference numerals 22 indicate control switches on the control panel, the individual switches being designated A1, A2, A3, B1, B2, etc. FIG. 16 shows that the defined switch SW1 has a position of A1. Switch SW2 has position A2. The control-specification design management system permits the designer to select the positions of the control switches.

The designer's choice as to which positions on the control panel may be selected for a particular switch is constrained by the type of the control switch. Depending on the type of control switch that was set in step S1-4, certain positions may be unavailable. FIG. 19 shows part of a look-up table that relates switch positions with the switch types. Thus, where a given switch position may not be used for a particular type of switch, and a switch of that type is presently under consideration by the designer, the control-specification design management system may indicate that the given switch position is not a proper candidate for selection by the designer.

Also, in this step, the designer sets the names of the control switches. To illustrate, reference is made to FIGS. 7 and 13. A hypothetical switch, SW2, is mentioned on line 5 of FIG. 7. As FIG. 7 shows, the designer has selected a name of "READING LAMP" for switch SW2. FIG. 13 shows an exemplary printout summarizing the names assigned by a designer to all of the various switches. Thus, positions and names are given to the switches.

Following the process of selecting the positions and the names of the control switches 22, the system control jumps to the storage mode where the data is stored (step S1-8), and then executes the process of selecting the connectors (step S1-10).

In executing the process of selecting the connectors, the look-up table is again referred to. The connector selection file presently or previously designed may be retrieved and used (step S1-12). As before, the control switch under consideration by the designer has a particular type, and the switch type constrains the particular connector terminals to which the switch may be correlated. As described above, the control-specification design management system uses the look-up table to determine which connector terminals and, thus, which loads are eligible candidates for control using the switch under consideration. FIG. 6 is a diagram showing an example of a display showing the setting of the loads 24.

When the connector selection mode ends, the system control jumps to the storage mode where it stores the data (step S1-11), and executes the process of displaying the names of the loads 24 (step S1-13).

The file to select the names of the loads 24, presently or previously designed may be retrieved and used (step S1-4). The default look-up table 12 as shown in FIG. 22 may also be referred to.

With reference to FIG. 7, the result of the designer's selections with respect to hypothetical switch SW2 may be seen. That is, FIG. 7 shows, on lines 18 and 19, that switch SW2 has been correlated to the 2nd terminal of a particular connector (for example, Connector 1 as depicted in FIG. 2), and that that terminal has been named "POWER SOURCE FOR READING LAMP".

Thus, the switch SW2, which has a particular switch type, has been given position A2 on control panel 20 (FIGS. 5 and 16) in conformity with its type. The switch has been named "READING LAMP" (FIG. 13) by the designer, who has designated that the switch be connected to the load named "POWER SOURCE FOR READING LAMP" via terminal 2 of a particular connector. Throughout the design process, the look-up table has been referred to for appropriate constraint information.

Figure 4:
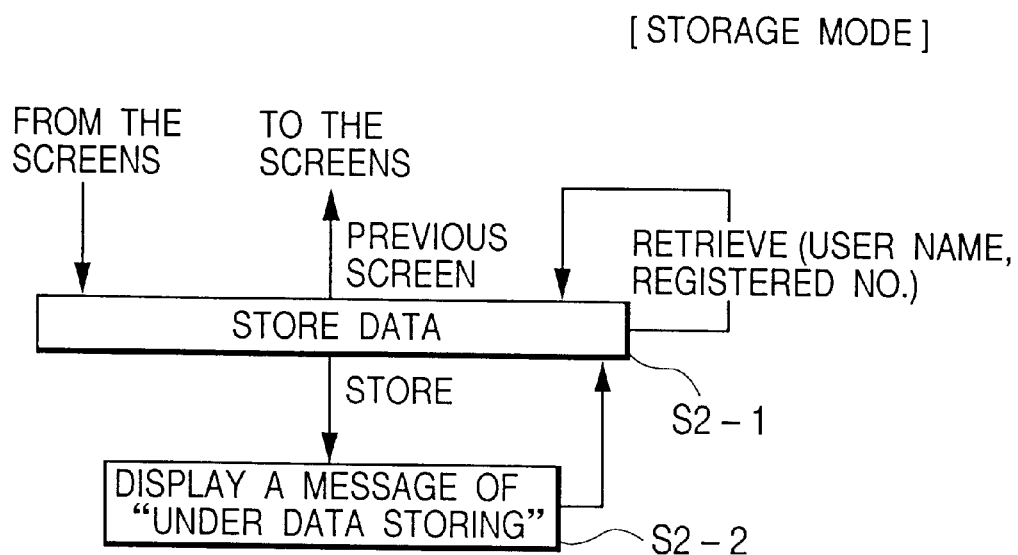
FIG. 4 is a flow chart showing a storage mode for storing control-specification information storage in the control-specification design management system.

2) Storage Mode for Storing Control-Specification Information 32 or Slip File 14 (FIG. 4)

This mode is a routine that is called as a subroutine and executed mainly in the generation mode for generating the control-specification information 32 or slip file 14.

When it is called, the system control receives the data to be stored and stores it as a file into the magnetic storing medium (step S2-1). During the execution of the storing process, a message like "under data storing" is displayed (step S2-2).

Figure 9:
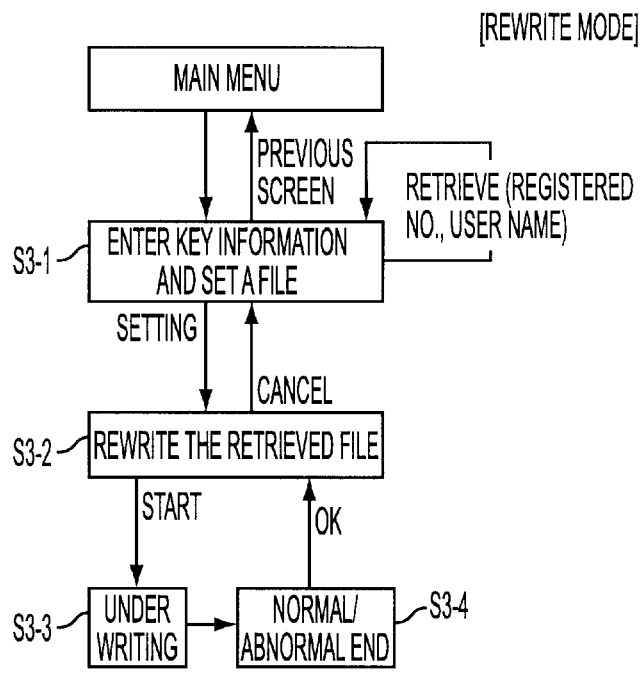
FIG. 9 is a flow chart showing a rewrite mode for rewriting control-specification information in the control-specification design management system.

3) Rewrite Mode for Rewriting Control-Specification Information 32 (or Slip File 14) (FIG. 9)

The system control executes a retrieval process according to key information (step S3-1) similar to that already described with respect to step S1-1 of FIG. 3. On the basis of the retrieval result, the system control executes a process of rewriting the file of the control-specification information 32 or slip file 14 presently or previously designed (steps S3-2 to 3-4).

Figure 10:
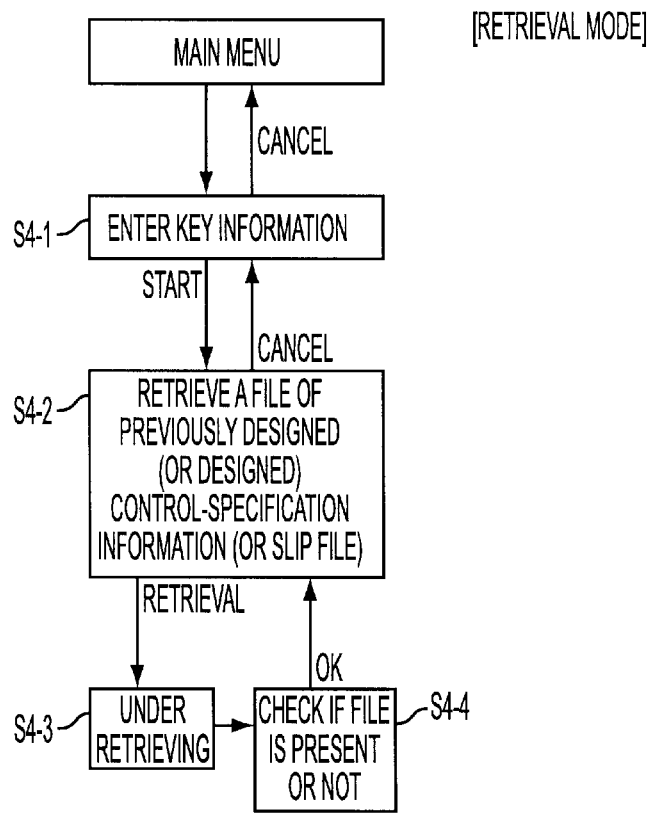
FIG. 10 is a flow chart showing a reference (retrieval) mode for referring a look-up table or a slip file prepared in the preceding design in the previous design in the control-specification design management system.

4) Reference (Retrieval) Mode for Referring to Control-Specification Information 32 (or Slip File 14) (FIG. 10)

The system control executes a retrieval process according to key information (step S4-1) similar to that already described with respect to step S1-1 of FIG. 3. On the basis of the retrieval result, the system control retrieves the file of the control-specification information 32 or slip file 14 presently or previously designed (steps S4-2 to 4-4).

5) Print Mode for Printing the Contents of the Slip File 14 (FIG. 11)

The system control executes a retrieval process according to key information (step S5-1), and, on the basis of the retrieval result, prints out the file of the control-specification information 32 or slip file 14 presently or previously designed (steps S5-2 to 5-3).

6) Dump Display Mode for Dumping Control-Specification Information 32 (or Slip File 14) (FIG. 12)

The system control executes a retrieval process according to key information (step S6-1), and, on the basis of the retrieval result, dumps into the display means the file of the control-specification information 32 or slip file 14 presently or previously designed (steps S6-2).

As seen from the foregoing description, the control-specification design management system 10 used for the load control devices 42 provides an easy computerization of the design work, of the addition to and alteration of the control-specification information 32, which thus far have been based on only manual work. The addition and alteration of the control-specification information 32 are substantially simplified. Further, it is easy to standardize the load control devices and the wire harness (viz., to establish standards for them and to manufacture them according to the standards). The reduction in the number of steps of the design process, the productivity improvement, and the cost reduction are realized.

To sum up, in designing the connection correspondence of the control switches to the loads, the control-specification design management system refers to the connection correspondence stored in the look-up table, or a slip file prepared in the preceding design, and presents to a designer candidates for the loads that can be controlled when these are connected to the control switches. While seeing the candidates, the designer selects the most suitable one from among those presented candidates. In this way, he designs control-specification information.

Since the contents of the formed slip file can be stored or printed out, the addition and alteration of the control-specification information are substantially simplified.

The thus-designed control-specification information is stored in the removable, rewritable storage and may be transmitted to the load control device when required. To alter the designed control-specification information, all a designer has to do is to alter only the control-specification information in the storage. Accordingly, in the present invention, there is no need of providing the exclusive load control devices or exclusive master multiplex communication units or exclusive slave multiplex communication units in a number equal to the number of kinds of the control-specification information, as is required in the conventional system.

What is claimed is:

1. A control-specification design management system comprising:
   a processor;
   a rewritable, removable storage;
   a look-up table pertaining to:
      a plurality of different control switch types,
      a plurality of control switches arrayed on an operation panel,
      a plurality of different load terminals for connecting to loads,
      a first relation between said plurality of control switches and said plurality of different control switch types, and a second relation between said plurality of load terminals and respective allowed corresponding ones of said plurality of different control switch types;

wherein said processor, in response to a selection of one of said plurality of control switches, accesses said look-up table and identifies candidates from said plurality of load terminals which may be controlled by said selected one of said plurality of control switches;

wherein said identification of said candidates is performed on the basis of said first relation and said second relation;

wherein said processor forms control-specification information based on (1) at least a selected one of said candidates from said plurality of load terminals and (2) at least said selected one of said plurality of control switches; and wherein said control-specification information is provided on said removable storage;

whereby said removable storage is coupled with a load control device which controls said plurality of loads on the basis of said control-specification information.

2. A control-specification design management system according to claim 1, wherein said load control device comprises:

a master multiplex communication unit for carrying out a process of multiplexing load control information based on the control-specification information through a multiplex transmission line, a plural number of slave multiplex communication units for carrying out a process of multiplexing load control information based on the control-specification information through a multiplex transmission line, and capable of controlling the loads by using the multiplexed load control information, and the master multiplex communication unit being interconnected with the slave multiplex communication units by multiplex transmission lines.

3. The control-specification design management system as set forth in claim 1, in which a slip file is formed using the formed control-specification information, and the contents of the slip file are printed out.

4. The control-specification design management system as set forth in claim 3, in which said processor of the control-specification design management system accesses, in addition to the look-up table, said slip file, wherein said accessed slip file relates to a preceding design.

5. The control-specification design management system as set forth in claim 2, in which said processor of the control-specification design management system accesses, in addition to the look-up table, a slip file which was prepared in a preceding design.

6. The control-specification design management system as set forth in claim 5, in which the contents of the slip file are printed out.

* * * * *